United States Patent
Noda et al.

(10) Patent No.: US 10,038,728 B2
(45) Date of Patent: Jul. 31, 2018

(54) COMMUNICATION TERMINAL AND COMMUNICATION PROCESSING METHOD

(71) Applicant: FUJITSU LIMITED, Kawasaki-shi, Kanagawa (JP)

(72) Inventors: Masahide Noda, Kawasaki (JP); Junichi Yura, Yokohama (JP); Hideto Kihara, Kawasaki (JP); Takashi Ohno, Kobe (JP)

(73) Assignee: FUJITSU LIMITED, Kawasaki (JP)

( * ) Notice: Subject to any disclaimer, the term of this patent is extended or adjusted under 35 U.S.C. 154(b) by 373 days.

(21) Appl. No.: 14/488,998

(22) Filed: Sep. 17, 2014

(65) Prior Publication Data

US 2015/0100626 A1    Apr. 9, 2015

(30) Foreign Application Priority Data

Oct. 8, 2013   (JP) ................... 2013-211410

(51) Int. Cl.
*G06F 15/16* (2006.01)
*G06F 7/04* (2006.01)
(Continued)

(52) U.S. Cl.
CPC ...... *H04L 65/1063* (2013.01); *G06F 17/3089* (2013.01); *H04L 67/025* (2013.01); *H04L 67/141* (2013.01)

(58) Field of Classification Search
CPC .............. H04L 29/08072; H04L 29/06; H04L 29/0809; H04L 29/06047; H04L 2463/101;
(Continued)

(56) References Cited

U.S. PATENT DOCUMENTS 7,254,684 B2 *   8/2007   Hiraiwa ................ G06F 3/0617
                                          707/999.201
8,285,808 B1 *  10/2012   Joel .................... G06F 17/30905
                                          345/473
(Continued)

FOREIGN PATENT DOCUMENTS

JP    2008-299414    12/2008
JP    2011-154652     8/2011
(Continued)

OTHER PUBLICATIONS

Reis, Charles et al., "Isolating Web Programs in Modern Browser Architectures," *EuroSys '09*, ACM Special Interest Group on Operating Systems, Apr. 2009, pp. 219-231.
(Continued)

*Primary Examiner* — Mahran Abu Roumi
(74) *Attorney, Agent, or Firm* — Staas & Halsey LLP

(57) ABSTRACT

A processor searches, when the communication terminal obtains an application, whether information that includes an origin of the application is stored in the storage device. The processor sets, when the information that includes the origin is not stored, information that includes an origin used within the communication terminal in a manner such that the information that includes the origin used within the communication terminal is different from information that is stored in the storage device and includes an origin.

10 Claims, 15 Drawing Sheets

(51) Int. Cl.
*H04L 29/06* (2006.01)
*H04L 29/08* (2006.01)
*G06F 17/30* (2006.01)

(58) Field of Classification Search
CPC ..... H04L 63/0428; G06Q 30/02; G06F 21/10; G06F 21/6218; G11B 20/00086
USPC .......................................................... 709/203
See application file for complete search history.

(56) References Cited

U.S. PATENT DOCUMENTS

| | | | | |
|---|---|---|---|---|
| 2007/0033569 | A1* | 2/2007 | Davidson | G06F 17/30902 717/103 |
| 2007/0274254 | A1* | 11/2007 | Iwazaki | H04L 12/66 370/328 |
| 2008/0301766 | A1* | 12/2008 | Makino | G06F 21/51 726/1 |
| 2009/0138937 | A1* | 5/2009 | Erlingsson | H04L 63/1416 726/1 |
| 2009/0328235 | A1* | 12/2009 | Lyons | G06F 21/52 726/27 |
| 2010/0107150 | A1* | 4/2010 | Kamada | G06F 8/65 717/170 |
| 2010/0169407 | A1* | 7/2010 | Hsueh | G06F 9/52 709/203 |
| 2010/0235829 | A1* | 9/2010 | Shukla | H04L 67/34 717/177 |
| 2010/0281107 | A1* | 11/2010 | Fallows | G06F 9/54 709/203 |
| 2010/0281537 | A1* | 11/2010 | Wang | G06F 9/468 726/22 |
| 2011/0099294 | A1* | 4/2011 | Kapur | H04L 67/02 709/246 |
| 2013/0055340 | A1 | 2/2013 | Kanai et al. | |
| 2013/0318627 | A1* | 11/2013 | Lundkvist | G06F 21/445 726/27 |
| 2014/0157369 | A1* | 6/2014 | Mischook | H04L 63/10 726/4 |
| 2015/0047051 | A1* | 2/2015 | Johns | H04L 63/10 726/27 |

FOREIGN PATENT DOCUMENTS

| | | |
|---|---|---|
| JP | 2013-045400 | 3/2013 |
| WO | WO 2012/112096 A1 | 8/2012 |

OTHER PUBLICATIONS

Extended European Search Report dated Mar. 4, 2015 for corresponding European Patent Application No. 14184957.0.
Examination Report dated Feb. 15, 2018 in related European Patent Application No. 14184957.0 (5 pages).

* cited by examiner

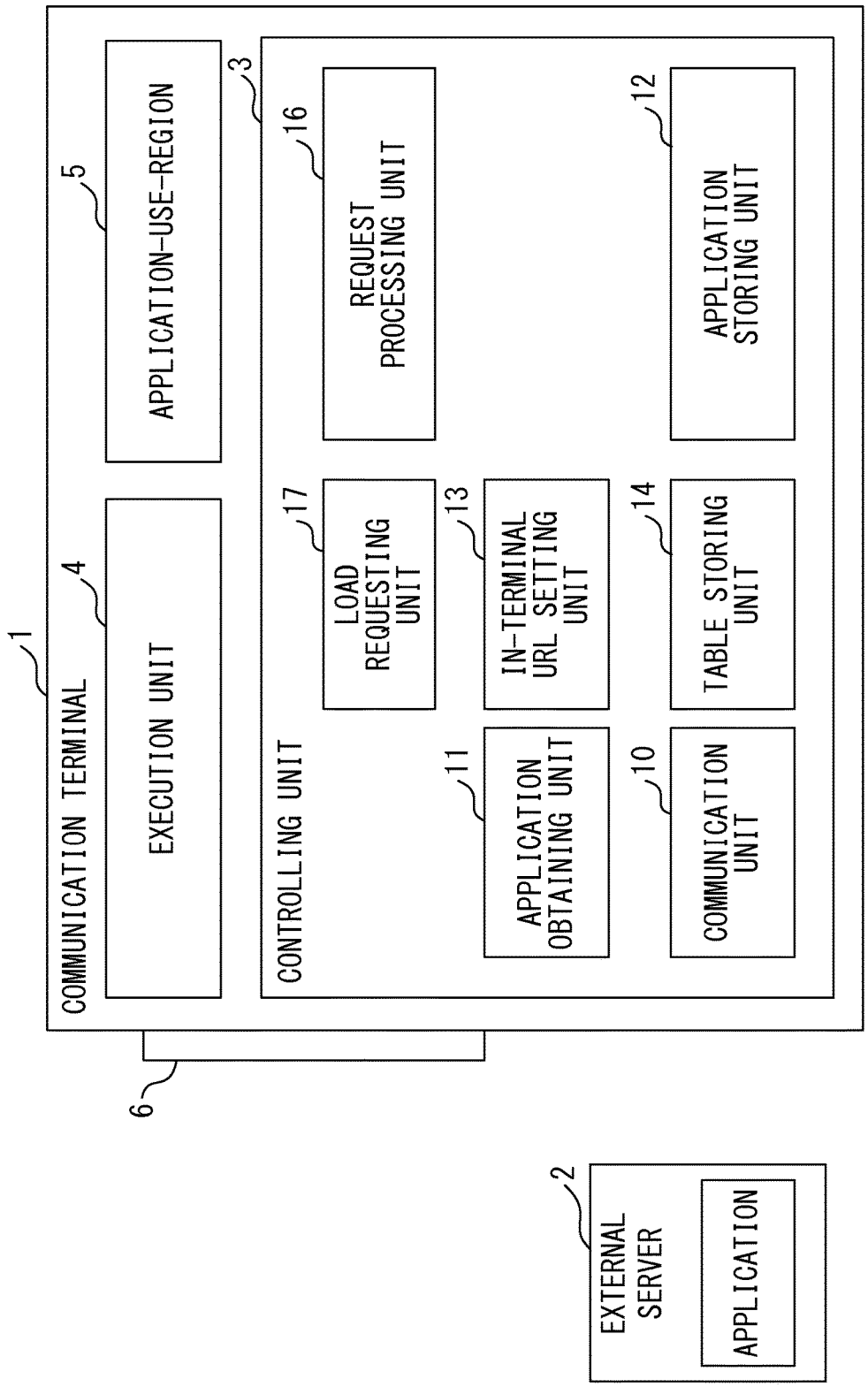
F I G. 1

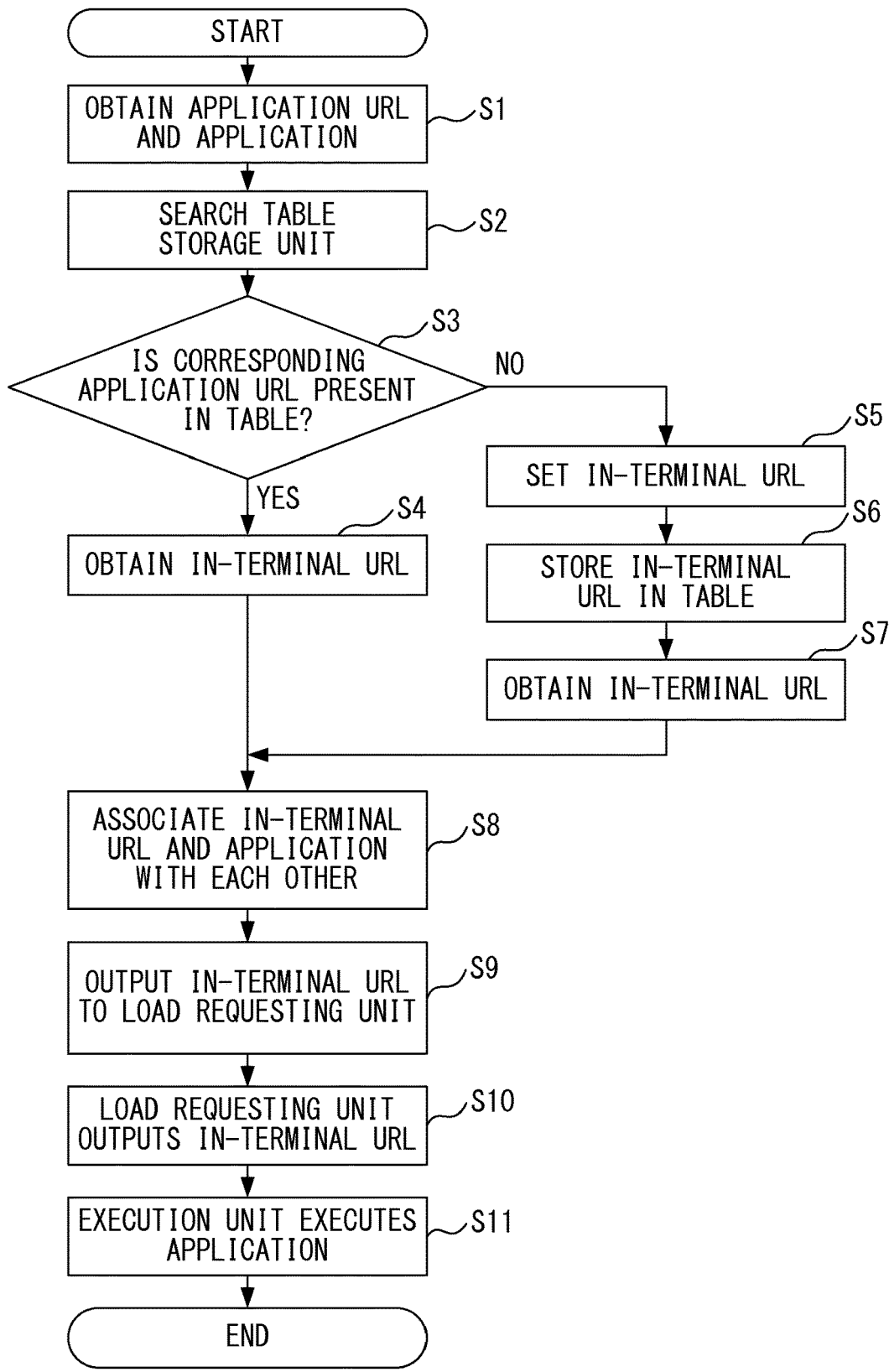
F I G. 3

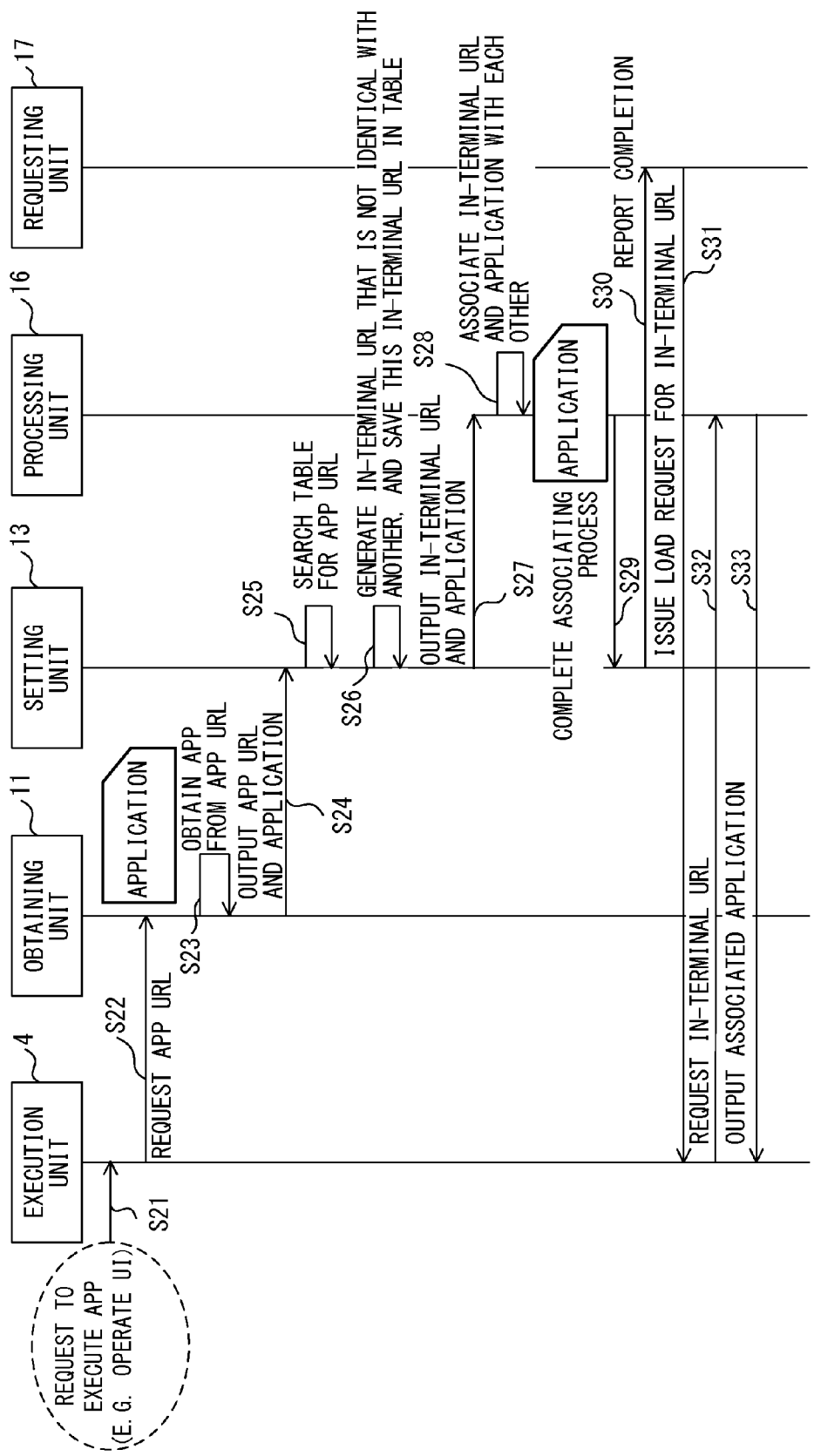
F I G. 7

| APPLICATION URL | IN-TERMINAL URL |
|---|---|
| http://srv.example.jp/app-jp | http://localhost:10000/app |
| http://www.example2.com/regapp | http://localhost:10001/app |

F I G. 8 A

| APPLICATION URL | IN-TERMINAL URL |
|---|---|
| http://srv.example.jp/app-jp | http://localhost:10000/app |
| http://www.example2.com/regapp | http://localhost:10001/app |
| http://app.example.com/app | http://localhost:10002/app |

F I G. 8 B

| APPLICATION URL | IN-TERMINAL URL |
|---|---|
| http://srv.example.jp/app-jp | http://localhost:10000/app |
| http://www.example2.com/regapp | http://localhost:10001/app |
| http://app.example.com/app | http://localhost:10002/app |

F I G. 1 1

COMMUNICATION TERMINAL AND COMMUNICATION PROCESSING METHOD

CROSS-REFERENCE TO RELATED APPLICATION

This application is based upon and claims the benefit of priority of the prior Japanese Patent Application No. 2013-211410, filed on Oct. 8, 2013, the entire contents of which are incorporated herein by reference.

FIELD

The embodiments discussed herein are related to a communication terminal and a communication processing method.

BACKGROUND

Examples of communication terminals include smartphones, portable phones, and tablet terminals. In recent years, the communication terminal enables executing applications in addition to perform a communication.

Examples of applications executed using the communication terminal include an application called a "native application". The native application is executed by an Operating System (OS) of a communication terminal. Hence, the native application has a high dependence on the communication terminal.

Examples of applications executed using a communication terminal also include an application called a "Web application". The Web application is executed by a browser of a communication terminal. Hence, the Web application has a low dependence on the OS.

Examples of the Web applications include a Hyper Text Markup Language (HTML) 5 application. The HTML5 application conforms to the HTML5 standard advocated by the World Wide Web Consortium (W3C).

The HTML5 uses an origin. According to the standard advocated by the W3C, the origin includes a protocol, a domain (host), and a port number. As a technology related to the origin, a technology has been proposed wherein access control for each part in an HTML document constituting a Web page is performed according to the origin of the part in the document (see, for example, patent document 1).
Patent document 1: Japanese Laid-open Patent Publication No. 2008-299414

SUMMARY

According to an aspect of the embodiments, a communication terminal including: a storage device and a processor configured to execute a process including: searching, when the communication terminal obtains an application, whether information that includes an origin of the application is stored in the storage device; and setting, when the information that includes the origin is not stored, information that includes an origin used within the communication terminal in a manner such that the information that includes the origin used within the communication terminal is different from information that is stored in the storage device and includes an origin.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

FIG. 1 illustrates an exemplary configuration of a communication terminal;

FIG. 3 is a flowchart illustrating an example of a process in accordance with an embodiment;

FIG. 7 is a sequence diagram illustrating an example of a process in accordance with example 1;

FIGS. 8A and 8B illustrate an example of a table in accordance with example 1;

FIG. 11 illustrates an example of a table in accordance with example 2;

DESCRIPTION OF EMBODIMENTS

Figure 2:
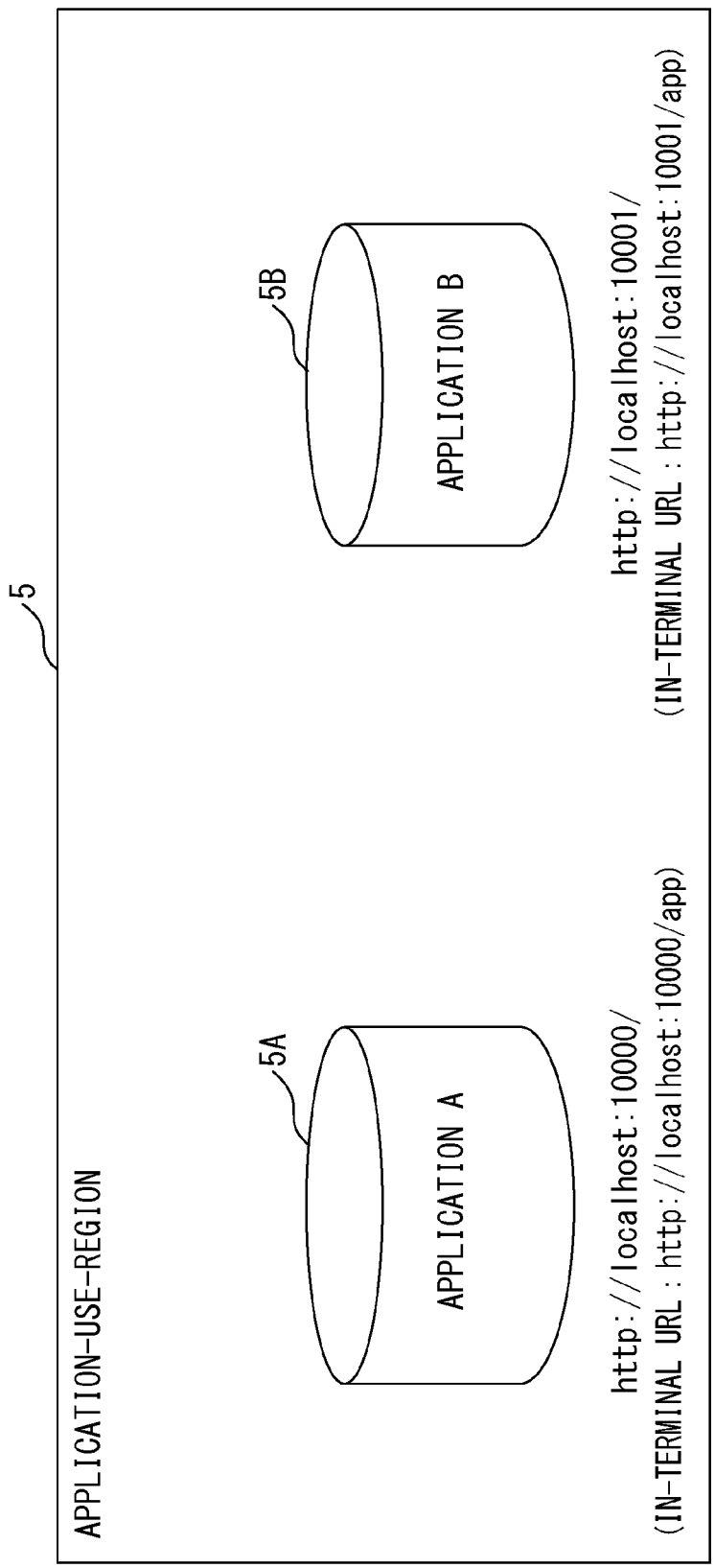
FIG. 2 is a block diagram illustrating an example of an application-use-region.

In an exemplary application utilization form wherein an application body is installed in an external Web server, a communication terminal communicates with the external Web server and executes the application installed in the external Web server. Thus, the communication terminal executes the application without obtaining the application.

When the communication terminal executes the application, the application stores information in a storage device of the communication terminal. A standard of the W3C stipulates that applications use different storage regions for individual origins. The storage regions are also called local storages.

Accordingly, in a case where a communication terminal executes an application by communicating with an external Web server, a plurality of applications each have a different origin. Hence, the individual applications use different local storages.

Meanwhile, in an exemplary utilization form of an application, a communication terminal uses an application obtained (downloaded) from an external Web server. The communication terminal stores the obtained application in a storage device. In the executing of the application, the communication terminal calls and executes the stored application. The communication terminal can obtain a plurality of applications.

When the communication terminal obtains an application, the origin of the application indicates the communication terminal instead of the external Web server. As described above, for each origin, a different storage region is used as a local storage.

Hence, when a plurality of applications with origins indicates the same communication terminal, the plurality of the applications use the same storage region. The storage region is also called a local storage. In this case, the same local storage is used.

Accordingly, the plurality of applications may each refer to or update information used by another application. For example, information written by one application may be referred to by another application. Information written by one application may be overwritten by another application. In this case, the information before the overwriting is lost.

FIG. 1 illustrates an example of a communication terminal in accordance with an embodiment. As indicated by the example in FIG. 1, a communication terminal 1 communicates with an external server 2. The communication terminal 1 has an environment to enable an application to be executed. An example of the communication terminal 1 may be a smartphone.

In an embodiment, assume that the application is a Web application executed on a Web browser. An example of the Web application is an HTML5 application that uses the HTML5 advocated by the W3C. The HTML5 application will hereinafter be simply referred to as an application.

The external server 2 stores an application. FIG. 1 depicts an example in which the external server 2 stores one application, but the external server 2 may store a plurality of applications.

The communication terminal 1, depicted as an example in FIG. 1, includes a controlling unit 3, an execution unit 4, an application-use-region 5, and a display unit 6. The communication terminal 1 may include another component. The controlling unit 3 includes a communication unit 10, an application obtaining unit 11, an application storing unit 12, an in-terminal URL setting unit 13, a table storing unit 14, a request processing unit 16, and a load requesting unit 17.

The execution unit 4 has a function to execute an application on a Web browser. The execution unit 4 may be called an HTML rendering engine. The HTML rendering engine executes an application by interpreting data written in a Web-page-description language. WebKit is an example of the HTML rendering engine.

The application-use-region 5 is a storage region used by an application. This region may be called a local storage. The local storage may be a region obtained by logically dividing the storage region of one storage device.

The application writes information indicating, for example, parameters such as an ID and a password into a local storage. The application-use-region 5 includes a plurality of local storages each associated with an origin.

FIG. 2 depicts an example of the application-use-region 5. In the example of FIG. 2, the application-use-region 5 includes a local storage 5A for an application A and a local storage 5B for an application B.

In the example of FIG. 2, an origin included in the in-terminal URL of the application A is different from an origin included in the in-terminal URL of the application B.
Application A: http://localhost:10000/(In-terminal URL: http://localhost:10000/app)
Application B: http://localhost:10001/(In-terminal URL: http://localhost:10001/app)

Accordingly, since the application A and the application B have different origins, different local storages are used.

The display unit 6 is a display apparatus provided at the communication terminal 1. During execution of an application, the display unit 6 displays various pieces of information. The display unit 6 may be provided with an input function. The display unit 6 may be, for example, a touch panel.

The communication unit 10 communicates with the external server 2. The communication unit 10 is controlled by the application obtaining unit 11. The application obtaining unit 11 controls the communication unit 10 to obtain an application from the external server 2. The process performed by the application obtaining unit 11 to obtain an application from the external server 2 may be referred to as download. The application obtaining unit 11 is an example of the obtaining unit.

The application storing unit 12 stores an application obtained by the application obtaining unit 11. The application storing unit 12 can store a plurality of applications. The application storing unit 12 is an example of the storing unit.

The in-terminal URL setting unit 13 sets an in-terminal URL for an application obtained by the application obtaining unit 11. The in-terminal URL includes an origin used within the communication terminal 1.

The in-terminal URL setting unit 13 sets in-terminal URLs in a manner such that the origins of a plurality of applications are different from each other. Hence, an in-terminal URL that has been set is not identical with any of the in-terminal URLs of the other applications. The in-terminal URL setting unit 13 is an example of the setting unit.

An in-terminal URL includes, for example, a protocol, a domain (host), a port number, and a pass. In an embodiment, the in-terminal URL setting unit 13 uses "http" as a protocol. However, the protocol is not limited to "http". A pass is omissible. Hence, the in-terminal URL setting unit 13 sets at least one of a domain or a port number in a manner such that each of the origins of a plurality of applications does not become identical with another. However, the in-terminal URL setting unit 13 may set a protocol. The protocol, domain (host), and port number of an in-terminal URL indicate an origin, and the in-terminal URL includes origin information.

The table storing unit 14 stores an in-terminal URL for each application. As an example, in an embodiment, the table storing unit 14 stores an in-terminal URL and information on the source of an application stored by the external server 2 in association with each other. The information on the source of an application may be a Uniform Resource Locator (URL). The URL may hereinafter be referred to as an application URL.

When the execution unit 4 requests an application, the request processing unit 16 performs a process of outputting the application to the execution unit 4. In the requesting of an application, the execution unit 4 outputs an in-terminal URL. The request processing unit 16 associates the in-terminal URL and the application with each other and outputs the in-terminal URL to the execution unit 4 together with the application. The request processing unit 16 is an example of the processing unit.

The load requesting unit 17 makes a request for the execution unit 4 to read an application. In response to the request, the execution unit 4 reads an application stored in the application storing unit 12. The load requesting unit 17 is an example of the requesting unit.

The following will describe a process in accordance with an embodiment with reference to FIG. 3. The communication unit 10 communicates with the external server 2. The application obtaining unit 11 obtains an application and an application URL from the external server 2 (step S1). The application may be obtained in any format, e.g., a file format.

The application obtained by the application obtaining unit 11 is stored in the application storing unit 12. The application obtaining unit 11 outputs the application URL to the in-terminal URL setting unit 13.

The in-terminal URL setting unit 13 searches a table of the table storing unit 14 for the application URL (step S2). The in-terminal URL setting unit 13 determines whether the table includes the application URL obtained by the application obtaining unit 11 (step S4).

When the table stores the application URL (YES in step S3), the request processing unit 16 obtains the in-terminal URL corresponding to the application URL from the table storing unit 14 (step S4).

Meanwhile, when the table does not store the application URL (NO in step S3), the in-terminal URL setting unit 13 sets an in-terminal URL corresponding to the application URL (step S5). The in-terminal URL setting unit 13 sets an in-terminal URL that is different from the in-terminal URLs stored in the table storing unit 14.

The in-terminal URL setting unit 13 stores the newly set in-terminal URL in the table of the table storing unit 14 in association with the application URL (step S6). Consequently, one new in-terminal URL and the application URL corresponding thereto are added to the table of the table storing unit 14.

The request processing unit 16 obtains the in-terminal URL (step S7). When step S3 is YES, the request processing unit 16 obtains the in-terminal URL in step S4. The request processing unit 16 associates the in-terminal URL and the application with each other (step S8). The request processing unit 16 reports to the load requesting unit 17 that an associating process has been completed, and outputs the newly set in-terminal URL to the load requesting unit 17 (step S9).

The load requesting unit 17 makes a request for the execution unit 4 to read the application obtained from the external server 2, and outputs the in-terminal URL to the execution unit 4 (step S10). In response to the request from the load requesting unit 17, the execution unit 4 outputs the in-terminal URL to the request processing unit 16.

When the communication terminal 1 obtains an application, the load requesting unit 17 makes a request for the execution unit 4 to read the application, thereby enabling the execution unit 4 to automatically execute the application.

The request processing unit 16 outputs the application associated with the input in-terminal URL to the execution unit 4. The execution unit 4 executes the input application (step S11). Through the aforementioned exemplary process, the communication terminal 1 obtains and executes an application from the external server 2.

In the setting of an in-terminal URL corresponding to a new application URL into the table storing unit 14, the in-terminal URL setting unit 13 sets a new in-terminal URL such that the already set in-terminal URLs corresponding to application URLs is different from the new in-terminal URL.

As an example, assume that the application URL of an application stored in the external server 2 is "http://app.example.com/app". The in-terminal URL setting unit 13 sets, for example, "http://localhost:10000/app" as an in-terminal URL. For an application that is different from this particular application, the in-terminal URL setting unit 13 sets "http://localhost:10001/app" as an in-terminal URL.

Hence, each of the in-terminal URLs of applications is not identical with another. The application-use-region 5 includes regions used by individual applications obtained by the communication terminal 1. Regions to be used are different for each origin in the application-use-region 5.

When the origin of the application A is different from the origin of the application B, the applications A and B do not use the same region. In this case, as depicted in FIG. 2, a local storage for the application A and a local storage for the application B are generated in the application-use-region 5.

Accordingly, even when the communication terminal 1 obtains a plurality of applications from the external server 2, the same region of the application-use-region 5 is not used in the executing of the applications.

The table storing unit 14 stores application URLs and in-terminal URLs in association with each other. Thus, when the communication terminal 1 obtains the same application A again from the same application URL, the application A can continuously use the same region of the application-use-region 5.

Meanwhile, the region used by the application A is not used by the application that is different from the application A. As an example, the region used by the application A is not referred to or updated by the application B. Accordingly, information stored in each individual region of the application-use-region 5 can be protected.

In the executing of an application using a Web browser, the execution unit 4 makes a request for the request processing unit 16 to read the application. In this case, the execution unit 4 outputs an in-terminal URL to the request processing unit 16 of the controlling unit 3.

In-terminal URLs and applications are associated with each other. The request processing unit 16 outputs to the execution unit 4 an application corresponding to the in-terminal URL output from the execution unit 4. This allows the execution unit 4 to execute the application.

Since applications executed by the execution unit 4 use different regions of the application-use-region 5, a plurality of applications do not use the same region. Accordingly, information used by one of the plurality of applications is not referred to or updated by the other applications.

Figure 4:
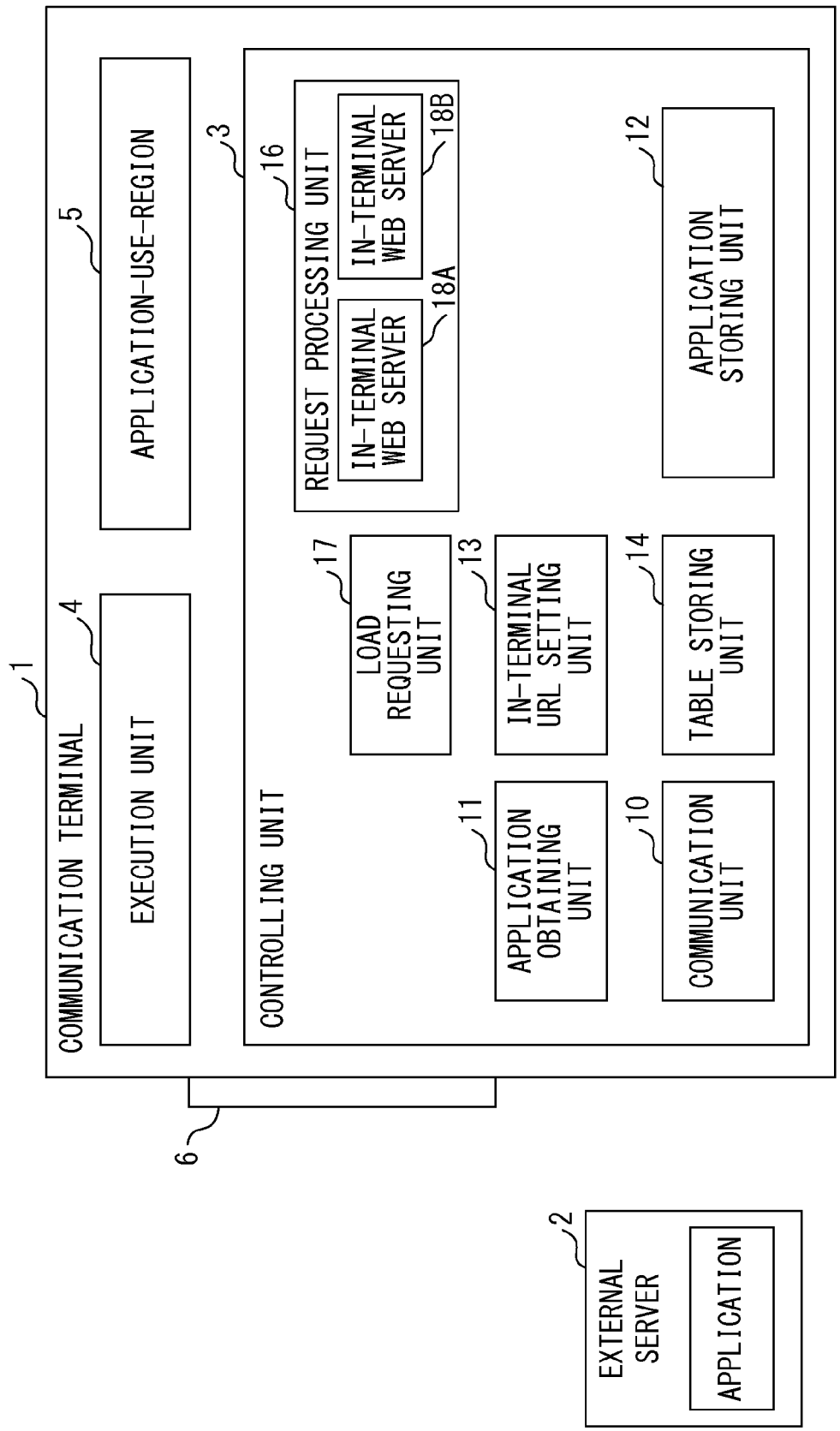
FIG. 4 illustrates an exemplary configuration provided with an in-terminal Web server.

FIG. 4 illustrates a variation of the configuration depicted in FIG. 1. In the example depicted in FIG. 4, the request processing unit 16 includes two in-terminal Web servers 18. The request processing unit 16 includes at least as many in-terminal Web servers 18 as the number of in-terminal URLs stored in the table of the table storing unit 14. The in-terminal Web server 18 is an example of the in-terminal server.

The execution unit 4 makes a request for an in-terminal Web server 18 to send an application corresponding to an in-terminal URL to the execution unit 4. The in-terminal Web server 18 functions as a virtual Web server and, at the request from the execution unit 4, outputs the application corresponding to an in-terminal URL to the execution unit 4. The execution unit 4 executes the application received from the in-terminal Web server 18.

The in-terminal Web servers 18 each correspond to a different in-terminal URL. Different in-terminal URLs have different origins. Hence, when the execution unit 4 executes applications, the applications use different regions of the application-use-region 5.

Assume, for example, that the request processing unit 16 includes an in-terminal Web server 18A corresponding to an application A and an in-terminal Web server 18B corresponding to an application B. When the execution unit 4 requests the in-terminal URL of the in-terminal Web server 18A, the request processing unit 16 outputs the application A to the execution unit 4.

The application-use-region 5 includes a region corresponding to an origin included in the in-terminal URL of the in-terminal Web server 18A (local storage A) and a region corresponding to an origin included in the in-terminal URL of the in-terminal Web server 18B (local storage B), and these regions are separated from each other. The application A, which is used by the execution unit 4, uses the local storage A.

When the execution unit 4 makes a request for an in-terminal Web server to send an application corresponding to an in-terminal URL to the execution unit 4, the host (domain) of the in-terminal URL is set to indicate the communication terminal 1. As an example, the in-terminal URL may be set as "http://localhost:10000/app".

Figure 5:
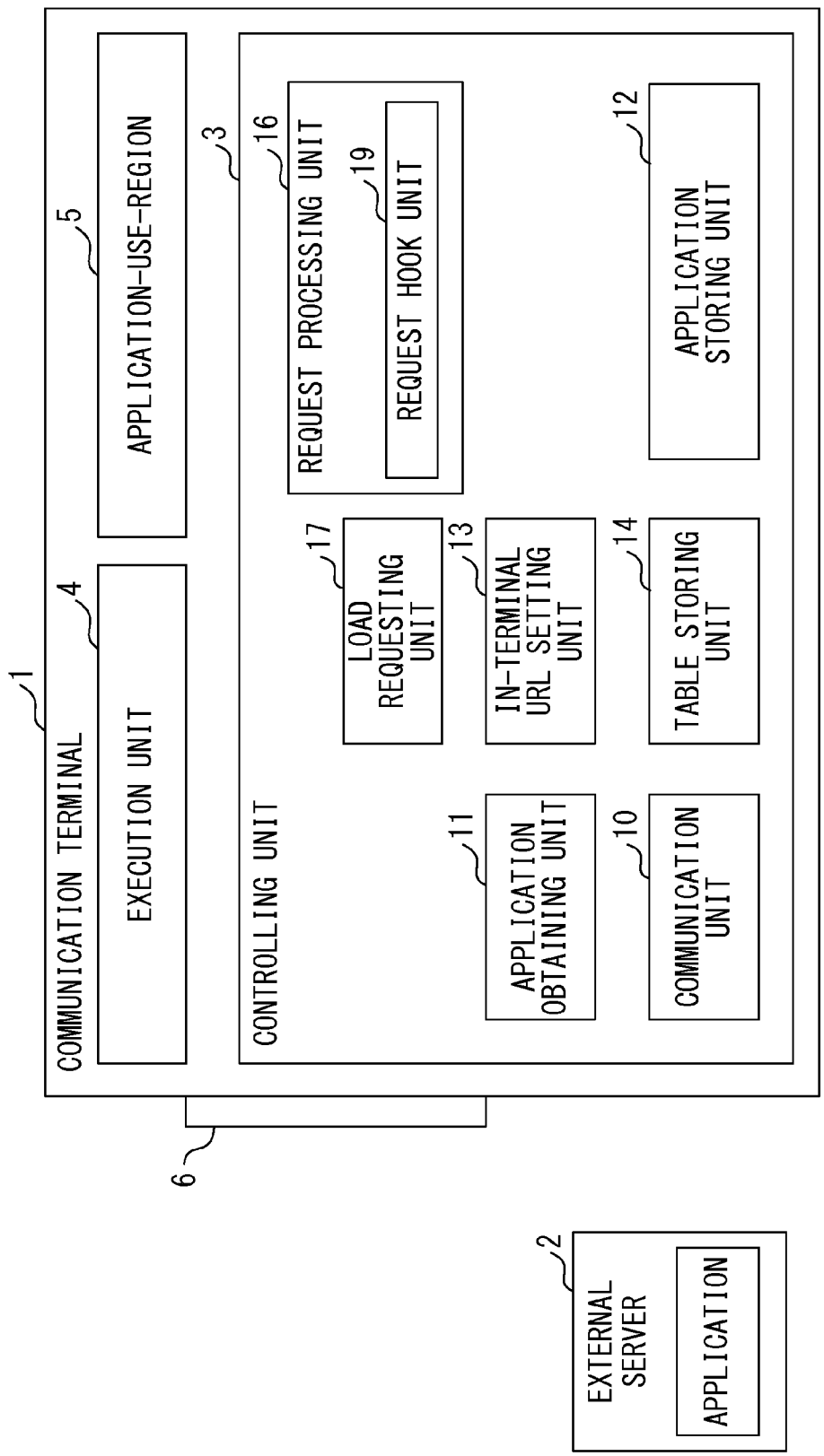
FIG. 5 illustrates an exemplary configuration provided with a request hook unit.

FIG. 5 illustrates another variation of the configuration depicted in FIG. 1. In the example depicted in FIG. 5, the request processing unit 16 includes a request hook unit 19. The request hook unit 19 monitors a request to be made by the execution unit 4 to send an in-terminal URL. When the execution unit 4 makes a request for the request processing unit 16 to send an application to the execution unit 4, the request hook unit 19 obtains this request.

The request hook unit 19 obtains an application associated with an in-terminal URL that the execution unit 4 made request from the application storing unit 12, and the request hook unit 19 outputs obtained application to the execution unit 4. Then, the execution unit 4 executes the application.

The request processing unit 16 in the example depicted in FIG. 5 is allowed that the request processing unit 16 does not include the in-terminal Web servers 18 depicted in FIG. 4. The in-terminal Web servers 18 use predetermined hardware resources. When the communication terminal 1 lacks the hardware resources for the in-terminal Web servers 18, the request hook unit 19 in the example of FIG. 5 may be used.

Meanwhile, the request hook unit 19 always monitors a request to be made by the execution unit 4, thereby leading to a large processing load. Thus, in the case of sufficient hardware resources, the in-terminal Web servers 18 may be used; otherwise, the request hook unit 19 may be used.

Figure 6:
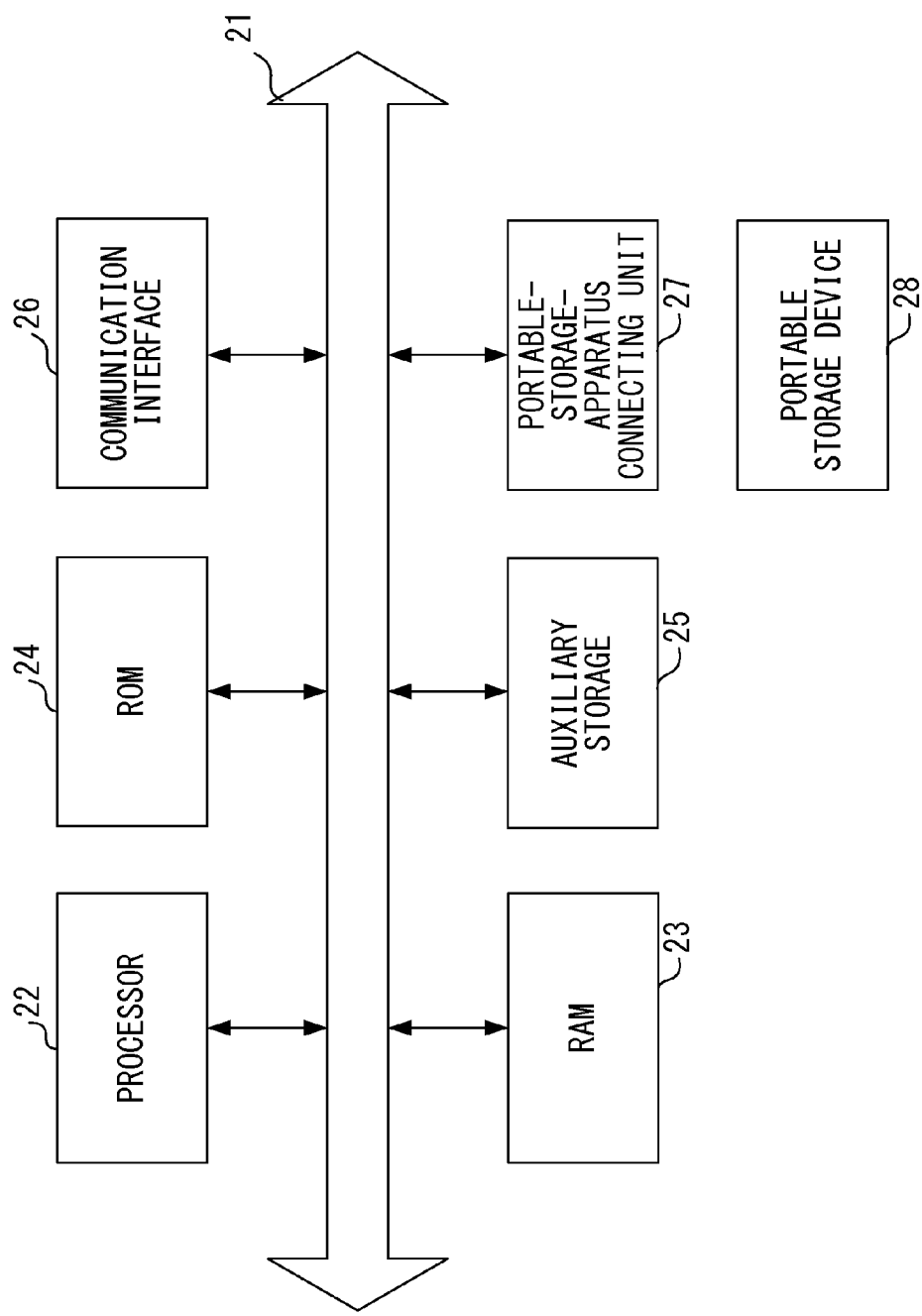
FIG. 6 illustrates an exemplary hardware configuration of a communication terminal.

The following will describe an exemplary hardware configuration of the communication terminal 1 with reference to FIG. 6. As depicted in FIG. 6, the communication terminal 1 includes a processor 22, a Random Access Memory (RAM) 23, a Read Only Memory (ROM) 24, an auxiliary storage 25, a communication interface 26, and a portable-storage-device connecting unit 27, all of which are connected to a bus 21.

The processor 22 is an arbitrary processing circuit such as a Central Processing Unit (CPU). The processor 22 executes a program mapped in the RAM 23. The ROM 24 is a nonvolatile storage device that stores a program to be loaded in the RAM 23. The program loaded in the RAM 23 may be stored in the auxiliary storage 25. Examples of the storage device include a semiconductor memory and a hard disk drive.

The portable-storage-device connecting unit 27 is connectable to a portable storage device 28. The portable storage device 28 may be a portable memory or an optical disk (e.g., Compact Disk (CD) and Digital Versatile Disk (DVD)).

The RAM 23, the ROM 24, and the auxiliary storage 25 are all tangible computer-readable storage media. None of these tangible storage media is a transitory medium such as a signal carrier wave.

As an example, the communication unit 10 may be achieved by the communication interface 26. The application obtaining unit 11, the in-terminal URL setting unit 13, the request processing unit 16, and the load requesting unit 17 may be achieved by the processor 22. The in-terminal Web server 18, the request hook unit 19, and a storage copy unit 30, which will be described hereinafter, may be achieved by the processor 22. The application storing unit 12 and the table storing unit 14 may be achieved by the RAM 23, the ROM 24, the auxiliary storage 25, or a portable storage device 28 connected to the portable-storage device connecting unit 27. The portable storage device 28 may include a program that executes a process of the present embodiments.

The application-use-region 5 may be achieved by the RAM 23. The local storages of the application-use-region 5 may be achieved using different logical regions of the RAM 23.

Example 1

Figure 9:
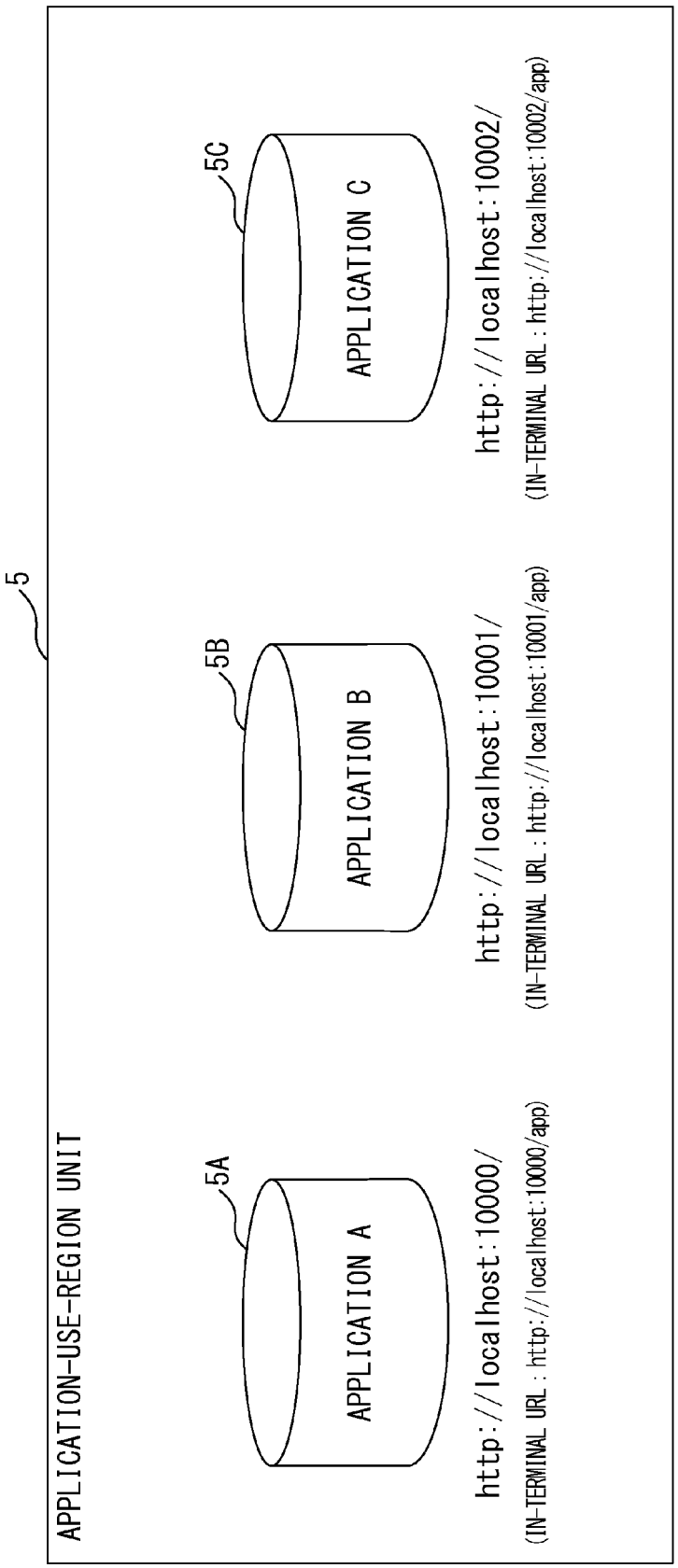
FIG. 9 illustrates an example of an application-use-region in accordance with example 1.

The following will describe example 1 with reference to FIGS. 7-9. Example 1 is based on the example in FIG. 4. That is, the request processing unit 16 includes the in-terminal Web servers 18. However, example 1 may be based on the FIG. 1.

Example 1 is based on the assumption that applications A and B have already been stored in the application storing unit 12 of the communication terminal 1 and that the communication terminal 1 has not accessed an application C set in the external server 2.

FIG. 7 is a sequence diagram illustrating an example of a process in accordance with example 1. FIG. 7 represents the application obtaining unit 11 as an obtaining unit 11; the in-terminal URL setting unit 13 as a setting unit 13; the request processing unit 16 as a processing unit 16; the load requesting unit 17 as a requesting unit 17. FIG. 7 may represent an application as an "app".

As depicted in FIG. 7, first, a request to execute the application C is made (step S21). As an example, a user operates a User Interface (UI) to make a request to execute the application C.

In, for example, a push delivery system, the execution unit 4 automatically makes a request to execute the application C. In the push delivery system, without the user operations on the communication terminal 1, the application C is automatically delivered from the external server 2 to the communication terminal 1, and a request to execute the application C is made.

When a request to execute the application C is made, the execution unit 4 makes a request for the application obtaining unit 11 to obtain the application C (step S22). In this case, the execution unit 4 outputs, to the application obtaining unit 11, the URL (application URL) of the application to be obtained.

Assume that the application URL is, for example, "http://app.example.com/app". The application obtaining unit 11 controls the communication unit 10 to obtain the application C stored in the external server 2 as the application URL (step S23).

The application obtaining unit 11 outputs the obtained application C and the application URL to the in-terminal URL setting unit 13 (step S24). The in-terminal URL setting unit 13 makes a search to check whether the table of the table storing unit 14 includes "http://app.example.com/app" (step S25).

In example 1, the communication terminal 1 has not accessed "http://app.example.com/app". Hence, the table of the table storing unit 14 does not include "http://app.example.com/app". FIG. 8A illustrates an exemplary table of the table storing unit 14. The table does not include the application URL of the application C.

The in-terminal URL setting unit 13 creates an in-terminal URL that includes an origin different from the origins of the in-terminal URLs stored in the table of the table storing unit 14, and stores the created in-terminal URL in the table (step S26). In the example depicted in FIG. 8A, the following two in-terminal URLs have already been used.

"http://localhost:10000/app"
"http://localhost:10001/app"

Hence, the in-terminal URL setting unit 13 set new in-terminal URLs that is different from the in-terminal URLs above. Assume that "http://localhost:10002/app" is set. This in-terminal URL corresponds to the application URL "http://app.example.com/app".

Accordingly, the in-terminal URL setting unit 13 newly stores the in-terminal URL and the application URL in the table of the table storing unit 14 in association with each other. FIG. 8B illustrates an exemplary updated table. As depicted in FIG. 8B, all of the in-terminal URLs are different from each other.

The in-terminal URL setting unit 13 outputs an in-terminal URL and an application to the request processing unit 16 (step S27). The request processing unit 16 associates the in-terminal URL and the application with each other (step S28). In this case, the application is the application C, and the in-terminal URL is "http://localhost:10002/app". Hence, the request processing unit 16 associates the application C and the in-terminal URL "http://localhost:10002/app" with each other.

Completing the associating process in step S28, the request processing unit 16 reports to the in-terminal URL setting unit 13 that the associating process has been completed (step S29). When receiving the report, the in-terminal URL setting unit 13 reports to the load requesting unit 17 that the associating process has been completed (step S30).

When receiving the report sent in step S30, the load requesting unit 17 issues a load request for the in-terminal URL (step S31). This is a request to read the application indicated by the in-terminal URL on behalf of the execution unit 4. The in-terminal URL for which the load requesting unit 17 issues the load request is "http://localhost:10002/app".

The execution unit 4 makes a request for the request processing unit 16 to send the application indicated by the in-terminal URL "http://localhost:10002/app" to the execution unit 4 (step S32). The request processing unit 16 includes an in-terminal Web server 18 having the in-terminal URL "http://localhost:10002/app".

The in-terminal Web server 18 outputs the application C, wherein the application corresponding to the in-terminal URL "http://localhost:10002/app", to the execution unit 4 (step S33). This allows the execution unit 4 to execute the application C, a newly obtained application. When the execution unit 4 executes the application C, the application-use-region 5 is used. A parameter, e.g., an ID or password, is used.

FIG. 9 illustrates an example of the application-use-region 5. As depicted in FIG. 9, the application-use-region 5 has a local storage 5C for the application C added thereto. The local storage 5C is a use region for the application C.

In the example depicted in FIG. 9, the application-use-region 5 includes the local storages 5A, 5B, and 5C. Since the local storage 5C is a use region for the application C, the applications A and B is not allowed to use the local storage 5C. That is, information stored in the local storage 5C are not referred to or updated by the applications A and B5C. This enables protection of information used by the application C.

Even when a new application is added, the in-terminal URL setting unit 13 sets, to the new application, an in-terminal URL having origin information including an origin that is different from the origins included in the in-terminal URLs already stored in the table storing unit 14. A use region of the application-use-region 5 is set for each origin, thereby information used by the new application is protected from other applications.

Example 2

Figure 10:
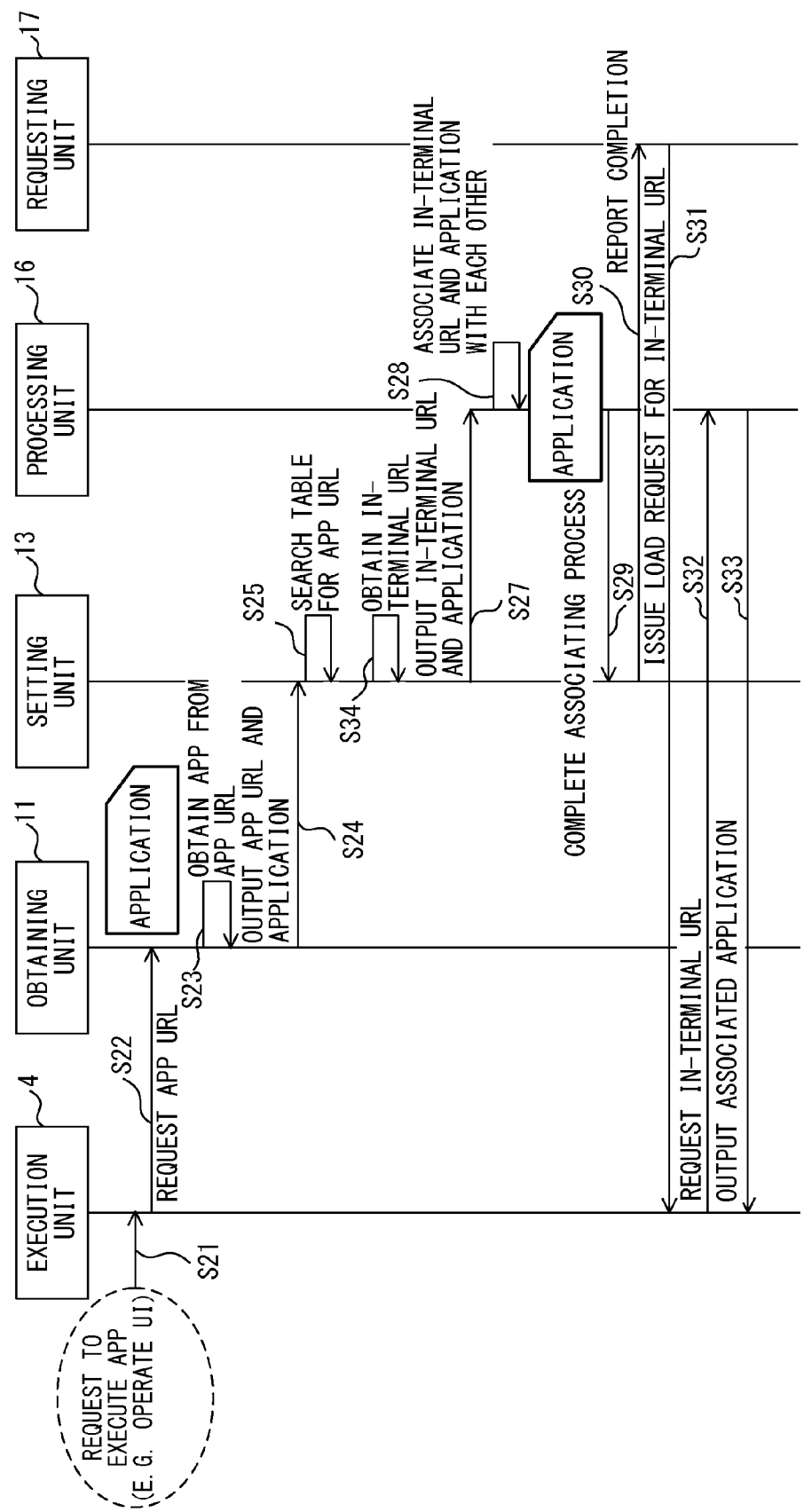
FIG. 10 is a sequence diagram illustrating an example of a process in accordance with example 2.

The following will describe example 2 with reference to FIGS. 10 and 11. Example 2 is based on the example in FIG. 4. That is, the request processing unit 16 includes the in-terminal Web servers 18. The communication terminal 1 obtains an application C from the external server 2. The communication terminal 1 has not accessed the application C, an application stored in the external server 2.

FIG. 10 is a sequence diagram of example 2. The sequence diagram of example 2 is different from the sequence diagram of FIG. 7 described with reference to example 1 in terms of step S26 of the sequence diagram of FIG. 7. Example 1 corresponds to a situation in which, in step S25, the in-terminal URL setting unit 13 searches the table storing unit 14 but does not find the application URL of the obtained application C.

In example 2, the application C, wherein an application that the application obtaining unit 11 obtains from the external server 2, has already been stored in the application storing unit 12. The in-terminal URL setting unit 13 searches the table storing unit 14 in step S25. The in-terminal URL setting unit 13 searches for the application URL of the application C. As an example, the in-terminal URL setting unit 13 searches for "http://app.example.com/app".

FIG. 11 depicts an exemplary table stored in the table storing unit 14 of example 2. The in-terminal URL setting unit makes a search to check whether the table includes "http://app.example.com/app". As illustrated in FIG. 11, the table stores "http://app.example.com/app".

Accordingly, the in-terminal URL setting unit 13 refers to the table of the table storing unit 14 and obtains an in-terminal URL corresponding to "http://app.example.com/app" (step S34). In the example of FIG. 11, the in-terminal URL is "http://localhost:10002/app".

The in-terminal URL setting unit 13 does not set a new in-terminal URL but uses an existing in-terminal URL. That is, the in-terminal URL "http://localhost:10002/app" is continuously used.

The application C, i.e., the application indicated by the in-terminal URL "http://localhost:10002/app", has already been used within the communication terminal 1. Thus, when the application obtaining unit 11 newly obtains the application C from the external server 2, the in-terminal URL used by the application C in the past is used. That is, an origin used by the application C in the past is used.

The newly obtained application C uses a region of the application-use-region 5 that the application C used in the past. That is, the newly obtained application C continuously uses a local storage 5C that the application C used in the past.

When, for example, the version of the application C stored in the external server 2 has been upgraded, the newly obtained application C preferably uses information such as parameters of the application C used in the past.

As described above, the newly obtained application C uses the local storage 5C that the application C used in the past, so that the newly obtained application C can continuously use information such as parameters.

Example 3

In examples 1 and 2, the in-terminal Web servers 18 perform processes for the request processing unit 16. Hence, when the execution unit 4 requests an application, an in-terminal Web server 18 corresponding to the requested application outputs the application to the execution unit 4. In example 3, the request processing unit 16 does not include an in-terminal Web server 18 but includes the request hook unit 19 described with reference to FIG. 5.

In example 3, the communication terminal 1 obtains an application C that the communication terminal 1 has not accessed. Accordingly, the in-terminal URL setting unit 13 makes a search to check whether the table of the table storing unit 14 stores the application URL of the newly obtained application C.

In example 3, the table storing unit 14 does not store the application URL of the application C. Hence, the in-terminal URL setting unit 13 sets an in-terminal URL that is different from those stored in the table. In example 3, the in-terminal URL of the application C is "http://localhost:10002/app".

Figure 12:
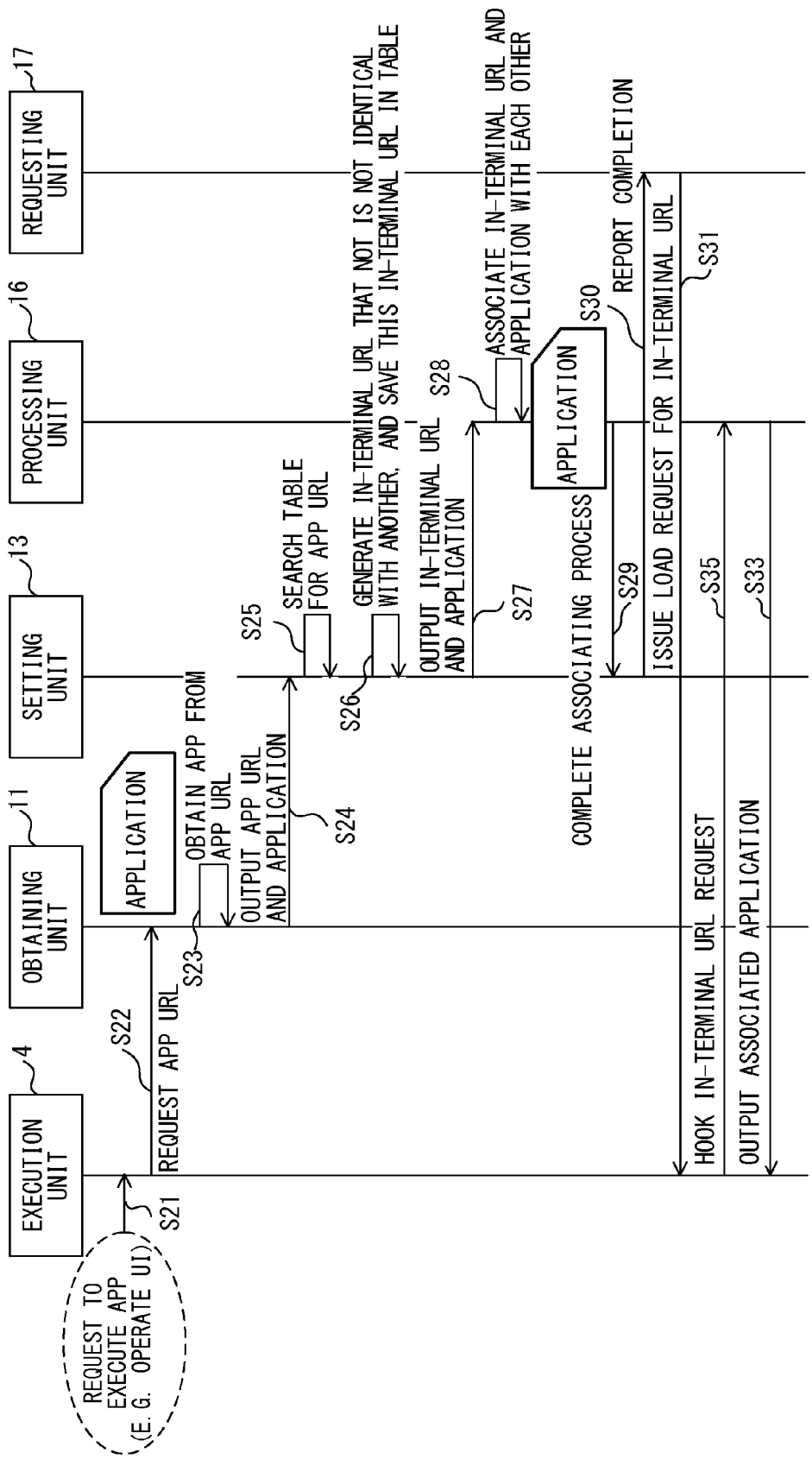
FIG. 12 is a sequence diagram illustrating an example of a process in accordance with example 3.

FIG. 12 illustrates the sequence diagram of example 3. The sequence diagram in FIG. 12 is different from the sequence diagram illustrated in FIG. 7 in terms of step S32 in FIG. 7. The request hook unit 19 monitors a request for an in-terminal URL from the execution unit 4. The request hook unit 19 obtains a request for the in-terminal URL of the application C, "http://localhost:10002/app", from the execution unit 4 (step S35).

Then, at the request for the in-terminal URL, the request hook unit 19 outputs to the execution unit 4 the application C, wherein the application corresponding to the in-terminal URL "http://localhost:10002/app". This allows the execution unit 4 to execute the application C.

When the communication terminal 1 does not have sufficient hardware resources to provide an in-terminal Web server 18, the request hook unit 19 of the request processing unit 16 performs the process. Also in this case, the in-terminal URL setting unit 13 sets in-terminal URLs each having a different origin for an individual application, thereby protecting local storages used by individual applications.

Example 4

In example 4, the request processing unit 16 does not include the in-terminal Web server 18 but includes the request hook unit 19. In example 4, the communication terminal 1 newly obtains an application C that the communication terminal 1 obtained in the past.

The in-terminal URL setting unit 13 makes a search to check whether the table of the table storing unit 14 stores the application URL of the newly obtained application C. In example 4, the table storing unit 14 stores the application URL of the application C. Hence, the in-terminal URL setting unit 13 obtains the in-terminal URL from the table. Assume that the in-terminal URL of the application C is "http://localhost:10002/app".

Figure 13:
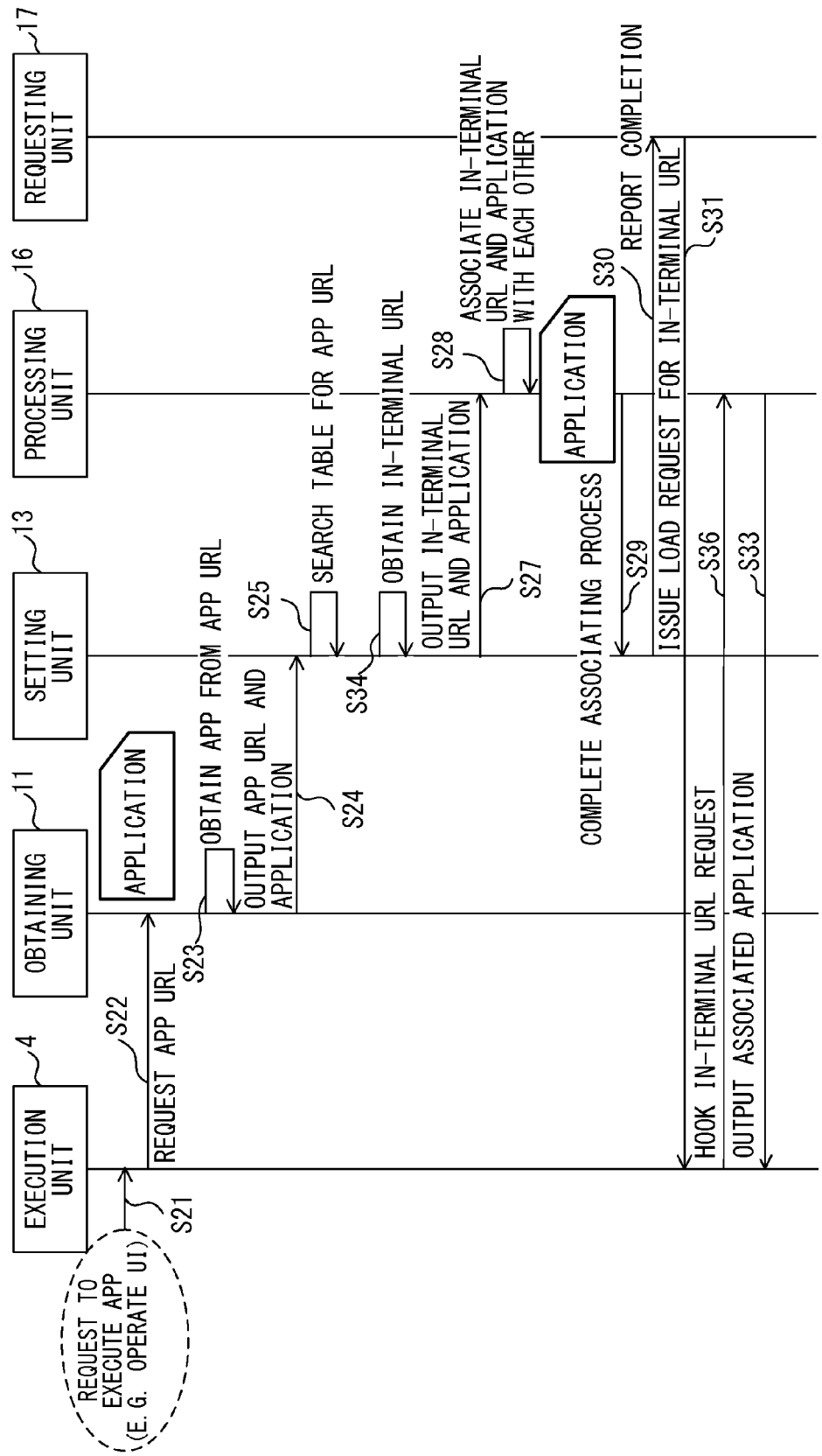
FIG. 13 is a sequence diagram illustrating an example of a process in accordance with example 4.

FIG. 13 illustrates the sequence diagram of example 4. The sequence diagram in FIG. 13 is different from the sequence diagram illustrated in FIG. 10 in terms of step S32 in FIG. 10. The request hook unit 19 monitors a request for an in-terminal URL from the execution unit 4. The request hook unit 19 obtains a request for the in-terminal URL of the application C, "http://localhost:10002/app", from the execution unit 4 (step S36).

Then, at the request for the in-terminal URL, the request hook unit 19 outputs to the execution unit 4 the application C, wherein the application corresponding to the in-terminal URL "http://localhost:10002/app". This allows the execution unit 4 to execute the application C.

The newly obtained application C uses an in-terminal URL having the same origin as the application C used in the past. Hence, the newly obtained application C uses the local storage 5C that the application C used in the past, so that the newly obtained application C can continuously use information such as parameters.

Example 5

Figure 14:
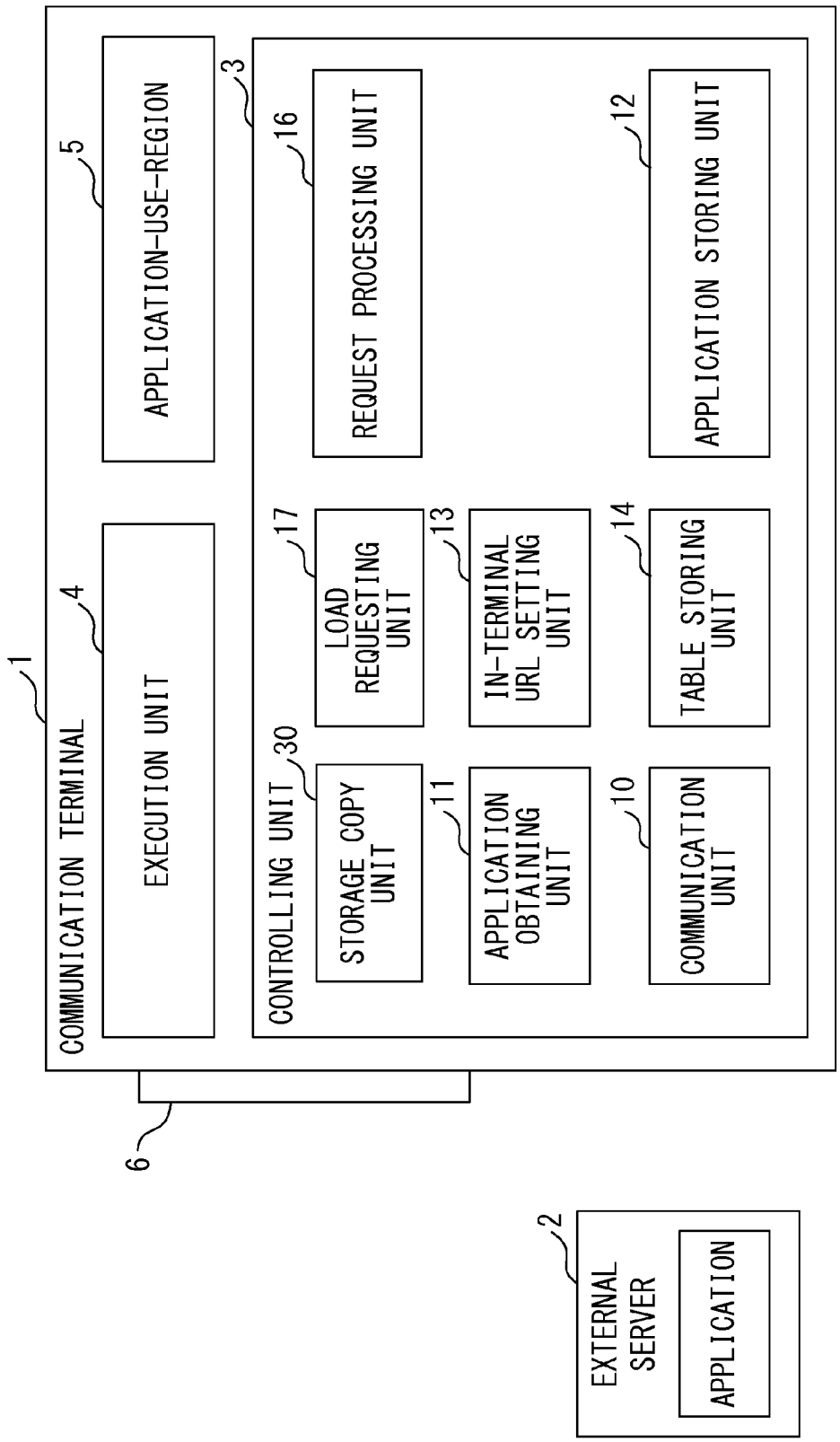
FIG. 14 illustrates an exemplary configuration of a communication terminal in accordance with example 5.
Figure 15:
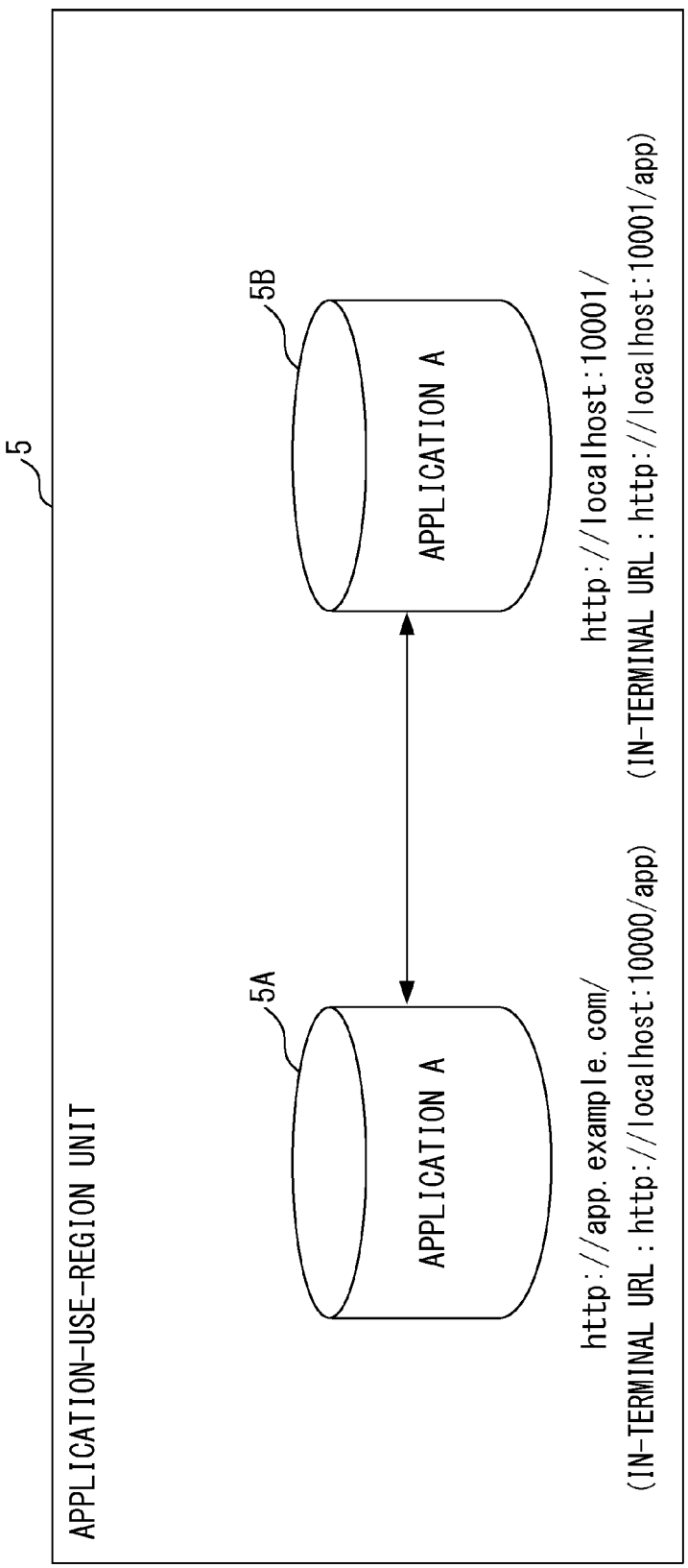
FIG. 15 illustrates an example of an application-use-region in accordance with example 5.

The following will describe example 5 with reference to FIGS. 14 and 15. FIG. 14 depicts an exemplary configuration of example 5. The controlling unit 3 of FIG. 14 is the same as the FIG. 1 with a storage copy unit 30 added thereto. The storage copy unit 30 is an example of the copy unit.

As depicted in FIG. 14, the external server 2 stores an application. A Web application to be executed using a browser may be obtained (downloaded) and executed by the communication terminal 1. This execution scheme may hereinafter be referred to as a "first execution scheme".

An application may be stored in the external server 2 and may be executed using a browser by the communication terminal 1 through a communication with the external server 2. This execution scheme may hereinafter be referred to as a "second execution scheme".

The execution unit 4 of the communication terminal 1 may use the application using either of the first execution scheme or the second execution scheme. In the first execution scheme, the communication terminal 1 obtains the application and thus does not frequently communicate with the external server 2.

In the second execution scheme, the communication terminal 1 communicates with the application stored in the external server 2. Hence, the communication terminal 1 can obtain the latest information on the application stored in the external server 2.

As described above, for each origin, a different region of the application-use-region 5 is used. Accordingly, the in-terminal URL setting unit 13 sets an in-terminal URL that is different from the existing in-terminal URLs.

The first execution scheme and the second execution scheme are different in terms of the origin of an application (hereinafter referred to as an application A). In the first execution scheme, since the communication terminal 1 obtains the application A, the origin of the application A is an in-terminal URL. In the second execution scheme, the application A is stored in the external server 2. Hence, the origin of the application A is the origin of the application A stored in the external server 2.

Accordingly, even for the same application A, origins are different between the first and second execution schemes. Thus, as depicted in FIG. 15, the same application A uses different local storages.

In FIG. 5A a local storage 5A is used in the second execution scheme. The origin does not indicate an in-terminal URL but indicates "http://app.example.com/", which is included in the application URL "http://app.example.com/app".

Meanwhile, the local storage 5B is used in the first execution scheme. The origin indicates "http://localhost:10001/", which is included in the in-terminal URL "http://localhost:10001/app". Hence, consistency is not achieved between pieces of information such as parameters used by the application A.

To achieve consistency between the two local storages used by the same application A, the storage copy unit 30 depicted in FIG. 14 copies the contents of the local storages. That is, the storage copy unit 30 copies information stored in a region of the application-use-region 5.

As an example, timings of a copying process to be performed by the storage copy unit 30 include a timing of switching the first execution scheme to the second execution scheme. In such a case, an origin requested by the execution unit 4 changes from an in-terminal URL to the origin of the external server 2. At such a timing, the storage copy unit 30 may copy information.

Timings of the copying process to be performed by the storage copy unit 30 also include a timing of switching the second execution scheme to the first execution scheme. In such a case, an origin requested by the execution unit changes from the external server 2 to an in-terminal URL. At such a timing, the storage copy unit 30 may copy information.

The storage copy unit 30 may copy all pieces of information stored in a local storage. However, the storage copy unit 30 may copy only pieces of information within the local storage that have been updated during the period from the present time to a predetermined past time. This may decrease the amount of information to be copied in comparison with a situation in which all pieces of information are copied.

The storage copy unit 30 may compare information stored in the local storage 5A with information stored in the local storage 5B so as to copy a different piece of information. Hence, under a condition in which the amount of information to be copied is decreased in comparison with a situation in which all pieces of information are copied, the storage copy unit 30 copies information stored in a local storage. However, in addition to information stored in a local storage, another piece of information may be copied. An example of the other piece of information is information such as Cookie.

An arrangement may be made to use the second execution scheme when the radio wave condition of the communication terminal 1 is good, and to use the first execution scheme when the radio wave condition is not good. In such a case, the communication terminal 1 may autonomously switch the execution scheme in accordance with the radio wave condition of the communication terminal 1. When the execution scheme is switched, the storage copy unit 30 may copy information.

Therefore, when different origins are set to the same application, the storage copy unit 30 copies information in a manner such that the contents of individual local storages configured for the origins become identical with each other.

The embodiments allow individual applications obtained by a communication terminal to use different storage regions of the communication terminal.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A communication terminal comprising:
a storage device including a plurality of logically divided storage areas to store a plurality of applications having external origins,
each storage area used for an application, among the plurality of applications, and not referred to or updated by other applications among the plurality of applications; and
a hardware processor configured to execute a process including:
searching, when the communication terminal obtains a second application having a second external origin among the plurality of applications having external origins, whether a second application uniform resource locator (URL) of the second application is stored in the storage areas in the storage device; and
setting, when the second application URL is not stored in the storage areas of the storage device, second in-terminal information that corresponds to the second application URL including a second internal origin used within the communication terminal in a manner such that at least the second internal origin of the second in-terminal information is different from a first in-terminal information that corresponds to a first application URL that included a first internal origin and previously stored in a first storage area among the storage areas in the storage device,
the hardware processor stores the second application URL in a second storage area among the storage areas,
when the second in-terminal information that includes the second different internal origin is set, and
when a first execution scheme and a second execution scheme are switched,
the first execution scheme includes storing a local copy of an application among the plurality of applications on the communication terminal and executing the stored local copy, the second execution scheme includes obtaining a result of an application among the plurality of applications being executed remotely from the communication terminal,
the setting of the second in-terminal information allowing switching between the first and second execution schemes to execute the first and second applications having respective first and second different in-terminal information, responsive to a radio wave condition for communication of the communication terminal.

2. The communication terminal according to claim 1, wherein the hardware processor executes the second application associated with the second in-terminal information, in response to the setting.

3. The communication terminal according to claim 1, wherein the hardware processor uses the first in-terminal information or the second in-terminal information that respectively includes the first or the second origin of the obtained application, according to a result of the searching.

4. The communication terminal according to claim 1, wherein the hardware processor sets an in-terminal server configured for each of the first in-terminal information or the second in-terminal information that respectively includes the first or the second internal origin of the first in-terminal information or the second in-terminal information, and the in-terminal server corresponding to the first in-terminal information or the second in-terminal information including a request of the first internal origin makes the first application associated with the first in-terminal information or the second application associated with the second in-terminal information that includes a request of the second internal origin executed.

5. The communication terminal according to claim 1, wherein the hardware processor monitors a request to execute the first or the second application, obtains, when the first in-terminal information or the second in-terminal information that includes an internal origin is requested, the in-terminal information that includes the internal origin, and executes the first or second application associated with the first in-terminal information or the second in-terminal information, respectively, that includes the internal origin.

6. The communication terminal according to claim 1, wherein the hardware processor, when the first in-terminal information or the second in-terminal information that respectively includes the first or the second origin is set, makes a request to read an application associated with the first in-terminal information or the second in-terminal information that includes the first or the second internal origin.

7. The communication terminal according to claim 1, wherein the application is a Hyper Text Markup Language 5 application.

8. The communication terminal according to claim 1, wherein the external origin includes a protocol, a domain, and a port number, and by the setting, at least one of the domain or the port number is set.

9. A process by a communication terminal including a storage device and a hardware processor, the process comprising:

obtaining a plurality of logically divided storage areas in the storage device to store a plurality of applications having external origins, each storage area used for an application, among the plurality of applications, and not referred to or updated by other applications among the plurality of applications; and by the hardware processor, searching when the communication terminal obtains a second application having a second external origin among the plurality of applications having external origins, whether a second application uniform resource locator (URL) of the second application is stored in the storage areas in the storage device;

setting when the second application URL is not stored in the storage areas of the storage device, second in-terminal information that corresponds to the second application URL including a second internal origin used within the communication terminal in a manner such that at least the second internal origin of the second in-terminal information is different from a first in-terminal information that corresponds to a first application URL that included a first internal origin and previously stored in a first storage area among the storage areas in the storage device; and storing the second application URL in a second storage area among the storage areas, when the second in-terminal information that includes the second different internal origin is set, and when a first execution scheme and a second execution scheme are switched, the first execution scheme includes storing a local copy of an application among the plurality of applications on the communication terminal and executing the stored local copy, the second execution scheme includes obtaining a result of an application among the plurality of application being executed remotely from the communication terminal, the setting of the second in-terminal information allowing switching between the first and second execution schemes to execute the first and second applications having respective first and second different in-terminal information, responsive to a radio wave condition for communication of the communication terminal.

10. A non-transitory computer-readable recording medium having stored therein a program for causing a communication terminal to execute a process comprising:

obtaining a plurality of logically divided storage areas in a storage device to store a plurality of applications having external origins, each storage area used for an application, among the plurality of applications, and not referred to or updated by other applications among the plurality of applications;

searching, when the communication terminal obtains a second application having a second external origin among the plurality of application having external origins, whether a second application uniform resource locator (URL) of the second application is stored in the storage areas in the storage device; and setting, when the second application URL is not stored in the storage areas in the storage device, second in-terminal information that corresponds to the second application URL including a second internal origin used within the communication terminal in a manner such that at least the second internal origin of the second in-terminal information is different from a first in-terminal information that corresponds to a first application URL that included a first internal origin and previously stored in a first storage area among the storage areas in the storage device; and storing the second application URL in a second storage area among the storage areas, when the second in-terminal information that includes the second different internal origin is set, and when a first execution scheme and a second execution scheme are switched, the first execution scheme includes storing a local copy of an application among the plurality of applications on the communication terminal and executing the stored local copy, the second execution scheme includes obtaining a result of an application among the plurality of application being executed remotely from the communication terminal, the setting of the second in-terminal information allowing switching between the first and second execution schemes to execute the first and second applications having respective first and second different in-terminal information, responsive to a radio wave condition for communication of the communication terminal.

\* \* \* \* \*